(12) United States Patent
Cope

(10) Patent No.: US 7,127,055 B2
(45) Date of Patent: Oct. 24, 2006

(54) INTERNATIONALLY ACCESSIBLE COMMUNICATIONS

(75) Inventor: Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 346 days.

(21) Appl. No.: 10/356,863

(22) Filed: Feb. 3, 2003

(65) Prior Publication Data
US 2004/0151297 A1 Aug. 5, 2004

(51) Int. Cl.
*H04M 7/00* (2006.01)
(52) U.S. Cl. .............................. 379/220.01; 379/221.08
(58) Field of Classification Search ........... 379/220.01, 379/221.01, 221.02, 219, 229, 230, 114.02, 379/221.08
See application file for complete search history.

(56) References Cited

U.S. PATENT DOCUMENTS

| | | | |
|---|---|---|---|
| 5,418,844 A | 5/1995 | Morrisey et al. | |
| 5,448,633 A | 9/1995 | Jamaleddin | |
| 5,524,146 A | 6/1996 | Morrisey et al. | |
| 5,566,235 A | 10/1996 | Hetz | |
| 5,572,583 A | 11/1996 | Wheeler, Jr. et al. | |
| 5,590,187 A | 12/1996 | Greenspan | |
| 5,675,635 A | 10/1997 | Vos et al. | |
| 5,684,866 A | 11/1997 | Florindi et al. | |
| 5,694,463 A | 12/1997 | Christie et al. | |
| 5,793,853 A | 8/1998 | Sbisa | |
| 5,825,780 A | 10/1998 | Christie | |
| 5,828,740 A | 10/1998 | Khuc et al. | |
| 5,864,614 A | 1/1999 | Farris et al. | |
| 5,875,237 A | 2/1999 | Bolinger, Jr. et al. | |
| 5,892,822 A * | 4/1999 | Gottlieb et al. ............. | 379/220 |
| 5,920,562 A | 7/1999 | Christie et al. | |
| 5,923,745 A | 7/1999 | Hurd | |
| 5,926,538 A | 7/1999 | Deryugin et al. | |
| 5,933,486 A | 8/1999 | Norby et al. | |
| 5,937,053 A * | 8/1999 | Lee et al. ..................... | 379/220 |
| 5,949,869 A | 9/1999 | Sink et al. | |
| 5,987,111 A * | 11/1999 | Madoch et al. ............. | 379/201 |
| 5,987,118 A | 11/1999 | Dickerman et al. | |
| 5,993,486 A | 11/1999 | Tomatsu | |
| 6,075,855 A | 6/2000 | Christiansen et al. | |
| 6,097,803 A | 8/2000 | Sbisa | |
| 6,128,378 A * | 10/2000 | Diener et al. ............... | 379/221 |
| 6,148,069 A | 11/2000 | Ekstrom et al. | |
| 6,215,864 B1 | 4/2001 | Goyal et al. | |
| 6,262,992 B1 | 7/2001 | Nelson et al. | |

(Continued)

FOREIGN PATENT DOCUMENTS

DE 199 54 224 A 1 5/2001

(Continued)

OTHER PUBLICATIONS

Dehni, Tarek, et al., "Intelligent Networks and the HP OpenCall Technology," Aug. 1997 Hewlett-Packard Journal, Article 6, XP-002259853, pp. 1-14.

(Continued)

*Primary Examiner*—William J. Deane, Jr.

(57) ABSTRACT

A call processing system that is configured to communicate with a plurality of remote processors, wherein the call processing system comprises a routing system configured to receive signaling for a call wherein the signaling indicates a called number including an international country code, and a processing system configured to process the international code to select one of the remote processors from the plurality of remote processors. The processing system is further configured to transfer a remote processor query to the one remote processor and process a remote processor response from the one remote processor to transfer a routing instruction for the call to the routing system.

12 Claims, 8 Drawing Sheets

U.S. PATENT DOCUMENTS

| | | |
|---|---|---|
| 6,453,029 B1 * | 9/2002 | Campbell ............... 379/114.2 |
| 6,470,081 B1 | 10/2002 | Sbisa et al. |
| 6,519,331 B1 * | 2/2003 | Stevens et al. ............ 379/145 |
| 6,529,504 B1 | 3/2003 | Sbisa |
| 6,567,514 B1 * | 5/2003 | Fleischer, III et al. .. 379/221.03 |
| 6,567,659 B1 | 5/2003 | Sbisa |
| 6,574,319 B1 | 6/2003 | Latter et al. |
| 6,603,851 B1 | 8/2003 | Smith et al. |
| 6,611,590 B1 | 8/2003 | Lu et al. |
| 6,628,774 B1 * | 9/2003 | Madoch et al. ........ 379/221.01 |
| 6,690,656 B1 | 2/2004 | Christie et al. |
| 6,731,744 B1 * | 5/2004 | Khuc et al. ............ 379/265.01 |
| 6,778,656 B1 * | 8/2004 | Stevens et al. ........ 379/221.01 |
| 2002/0101974 A1 * | 8/2002 | Zbib |
| 2004/0032864 A1 * | 2/2004 | Sbisa et al. |
| 2004/0152463 A1 * | 8/2004 | Grootwassink et al. |

FOREIGN PATENT DOCUMENTS

| | | |
|---|---|---|
| EP | 0 631 447 A2 | 12/1994 |
| EP | 0 901 297 A2 | 3/1999 |
| WO | WO 99/35859 | 7/1999 |
| WO | WO 00/42782 | 7/2000 |

OTHER PUBLICATIONS

Briere, Daniel, "Sprint plans sweeping Network Revisions," Network World, Sep. 20, 1993, Network World, Inc.

Kettler, H. W., et al., "Evolution of the Intelligent Network To Support Global Services," International Switching Symposium, Oct. 25, 1992, pp. 53-57, vol. 2, Yokohema, Japan.

Sykes, Jack S., "Globalization of Intelligent Network Services," AT&T Technical Journal, Sep./Oct. 1992, pp. 6-12, No. 5, Short Hills, New Jersey.

Fujioka, Masanobu, et al., "Towards Globalization of Intelligent Network For Coming Age," International Switching Symposium, Oct. 1992, vol. 2, pp. 43-47, Yokohema, Japan.

"International Freephone Service" Series E: Overall Network Operation, Telephone Service, Service Operation and Human Factors, International Telecommunication Union, Feb. 2001, E.152.

* cited by examiner

INTERNATIONALLY ACCESSIBLE COMMUNICATIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to internationally accessible communications.

2. Description of the Prior Art

International country codes are one, two, or three digit numbers that identify various countries in the world. Calls placed using an international country code are routed to a communication network associated with a particular country assigned that code.

Compared to domestic calls, international calls are expensive and complex. Toll-free international calls pose a separate challenge from regular international calls because the called party pays the service charges rather than the caller. Thus, called parties, such as a call center for an airline, may desire to retain precise control over how and when international toll-free calls are connected.

One method for providing precise control over international toll-free calls includes routing calls based upon the country code dialed. For example, a communication network recognizes a particular country code when a caller dials an international toll-free number. The communication network routes the call to a service platform associated with that country code. The service platform answers the call, obtains information from the caller, and can then connect the caller to a call center. Other less desirable callers can be re-routed to other call centers. Importantly, in this method calls are routed through the service platform.

A drawback to this method is that the service platform remains connected to calls to provide service and billing processes. As a consequence, the service platform wastes valuable processing time and bandwidth. Furthermore, the service platform requires additional equipment, staffing, and support beyond existing network configurations. Unfortunately, this method does not allow for efficient and economical international call services.

SUMMARY OF THE INVENTION

The invention helps solve the above problems with technology that improves international communications. Advantageously, the technology may eliminate the need for service platforms to process and connect various types of international calls. If desired, the technology may allow for more efficient and economical international call services.

Examples of the invention include a method of call processing system operation, a call processing system, and a software product for call processing systems. The software product includes software that directs the operation of call processing systems, and a storage system that stores the software.

Some examples of the invention comprise a method of operating a call processing system that is configured to communicate with a plurality of remote processors. The method comprises receiving signaling for a call wherein the signaling indicates a called number including an international country code, processing the international country code to select one of the remote processors from the plurality of remote processors, transferring a remote processor query to the one remote processor, receiving a remote processor response from the one remote processor, and processing the remote processor response to transfer a routing instruction for the call.

In some examples of the invention, the call processing system comprises a routing system and a Service Control Point (SCP), wherein the SCP is configured to communicate with the plurality of remote processors, and wherein receiving the signaling for the call and processing the international country code to select the one remote processor comprises, in the routing system, receiving a signaling message including the called number and the international country code and processing the international country code to transfer an SCP query including the international country code, and in the SCP, receiving the SCP query and processing the international country code to select the one remote processor.

In some examples of the invention, receiving the signaling for the call comprises receiving the signaling in the SCP.

In some examples of the invention, transferring the remote processor query and receiving the remote processor response comprises transferring the remote processor query from the SCP and receiving the remote processor response in the SCP.

In some examples of the invention, processing the remote processor response to transfer the routing instruction comprises processing the remote processor response in the SCP to transfer an SCP response including the routing instruction, and further comprising, in the routing system, receiving the SCP response, and in the routing system, processing the routing instruction to route the call.

In some examples of the invention, the method further comprises receiving the remote query in the one remote processor, processing the remote processor query in the one remote processor, and transferring the remote processor response from the one remote processor.

BRIEF DESCRIPTION OF THE DRAWINGS

The same reference number represents the same element on all drawings.

DETAILED DESCRIPTION OF THE PREFERRED EMBODIMENT

FIGS. 1–8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
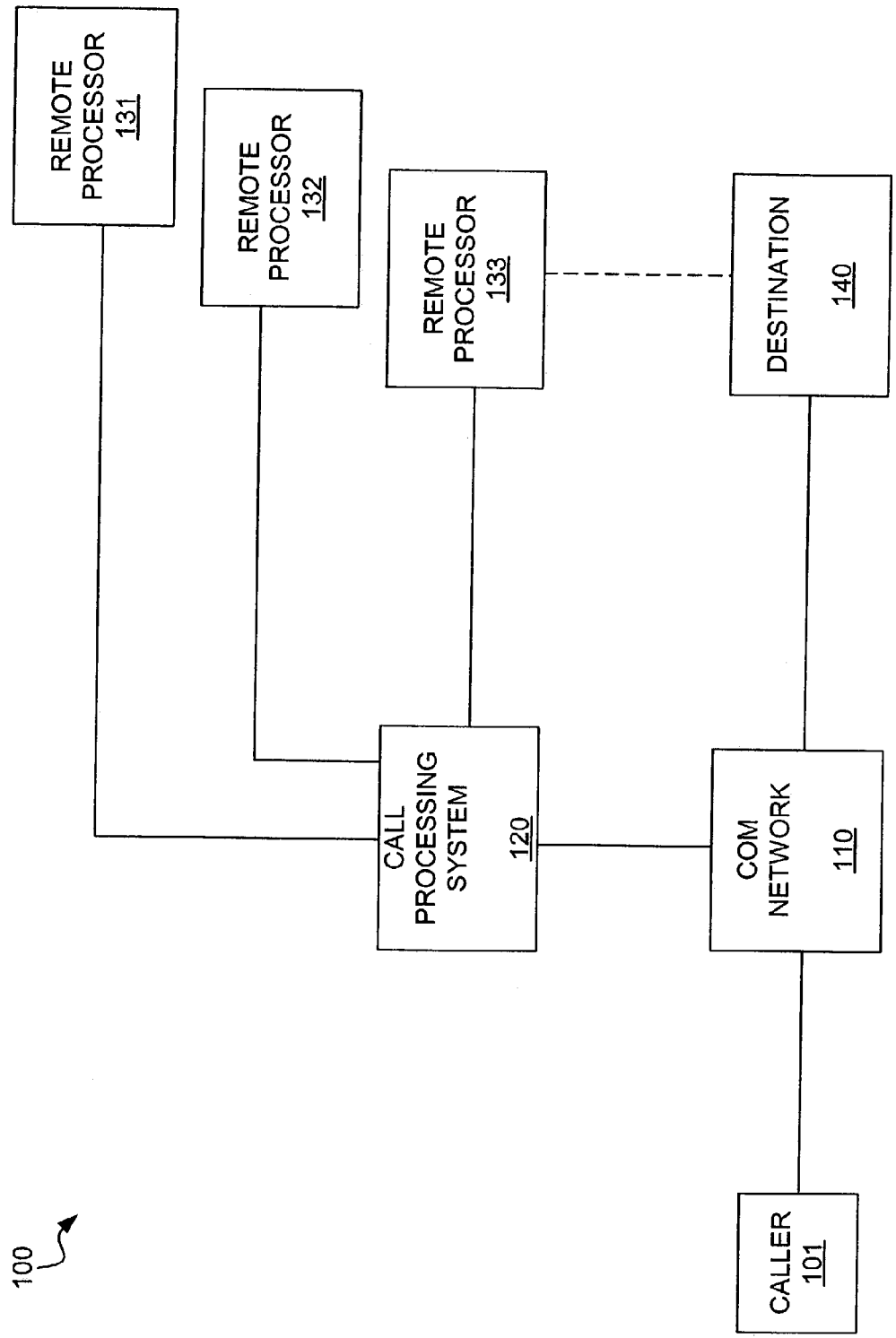
FIG. 1 illustrates a call processing system in an embodiment of the invention.
Figure 2:
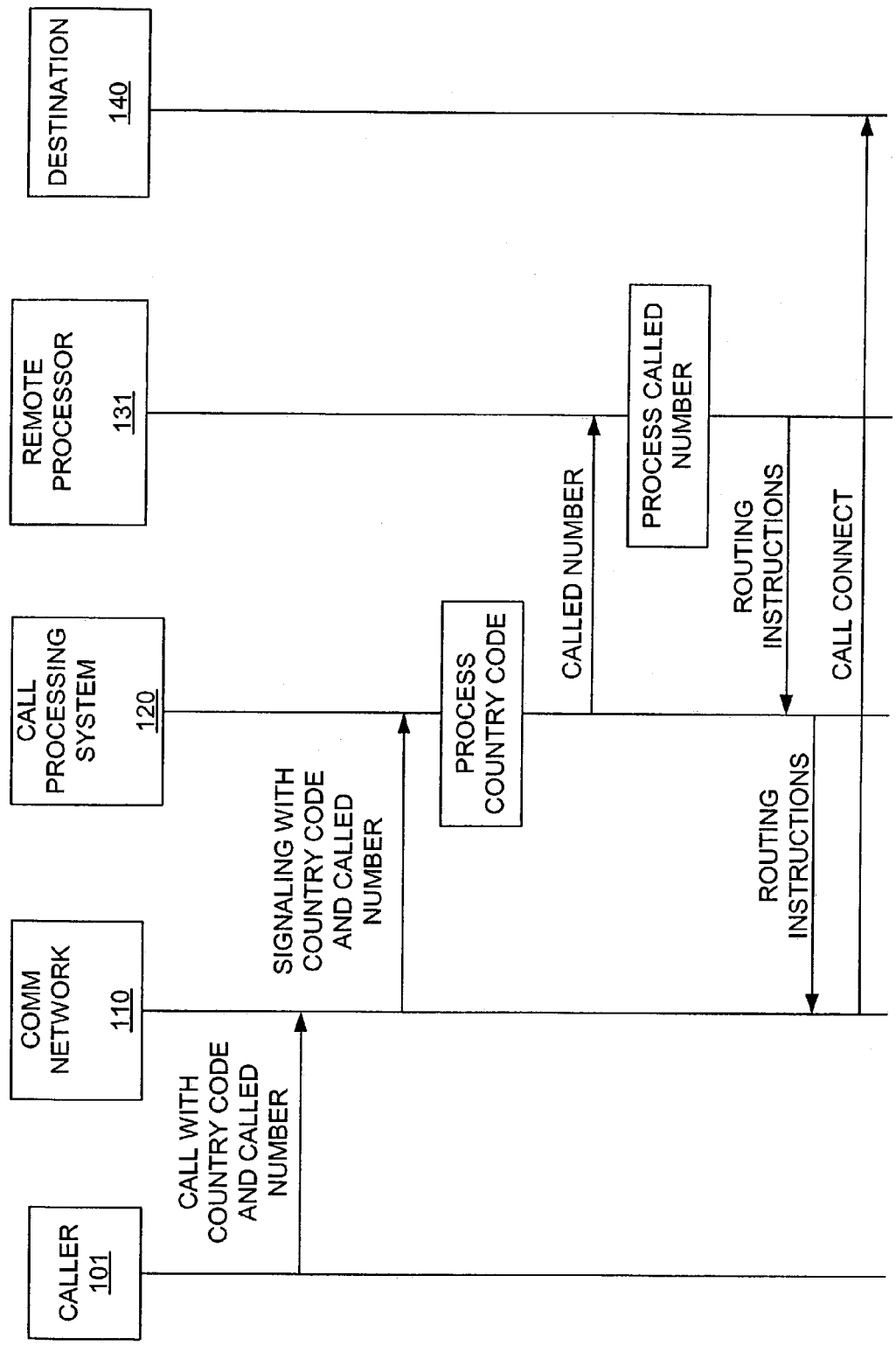
FIG. 2 illustrates the operation of a call processing system in an embodiment of the invention.
Figure 3:
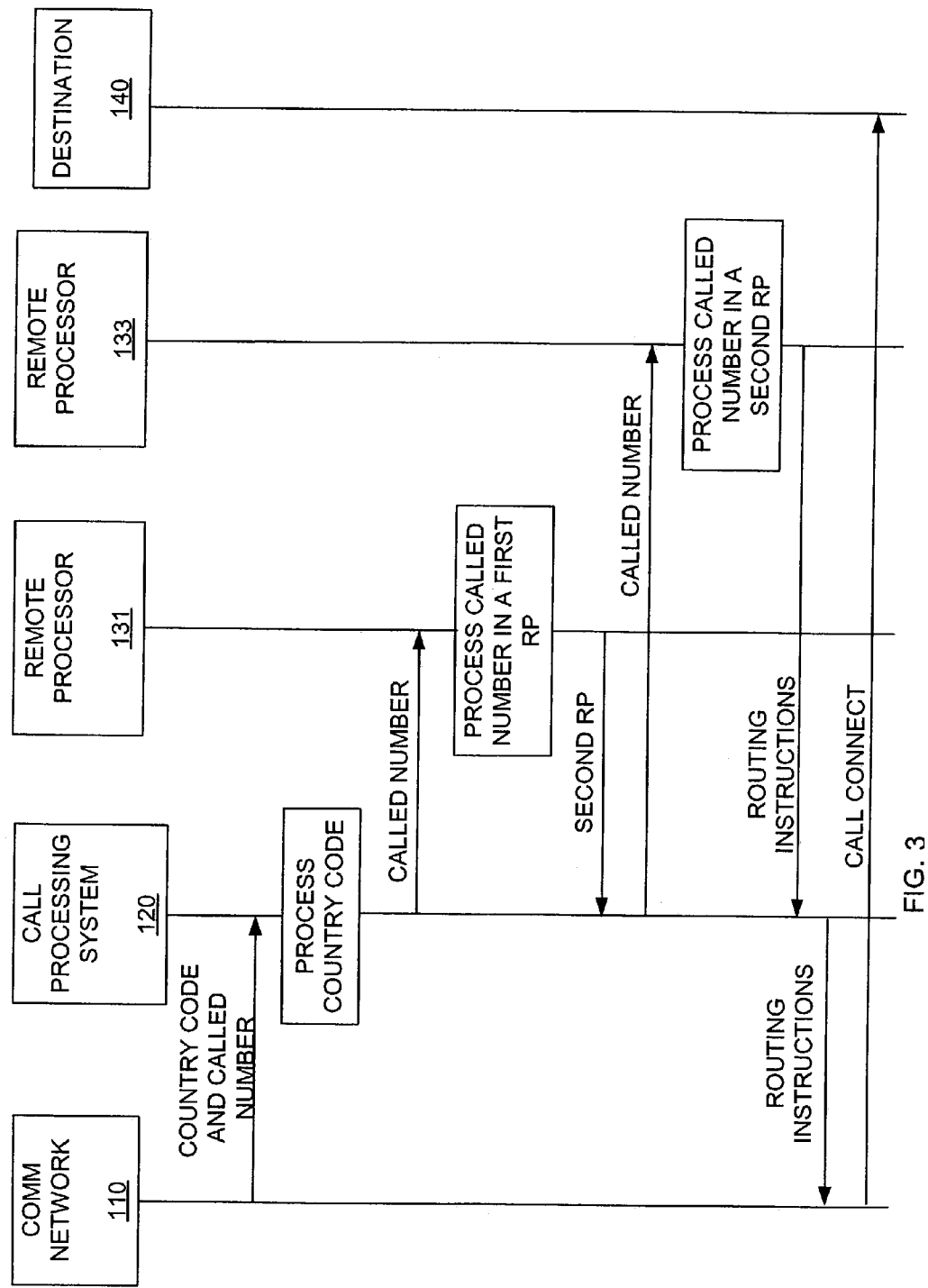
FIG. 3 illustrates the operation of a call processing system in an embodiment of the invention

First Embodiment Configuration and Operation—FIGS. 1–3

FIG. 1 illustrates communication system 100 in an embodiment of the invention. Caller 101 is connected to communication network 110. Communication network 110 is connected to call processing system 120. Communication network 110 is also connected to destination 140. Call processing system 120 is connected to one or more remote processors (RPs), including RPs 131, 132, 133. RP 133 is controlled by destination 140. Communication network 110 represents a collection of Public Switched Telephone Networks (PSTNs). Call processing system 120 could include a Service Control Point (SCP) or a similar processing system.

RPs comprise communication devices capable of receiving RP queries, processing the queries to select call routing instructions, and transferring the instructions in response to the queries. An example of an RP could include a Call Manager system from GeoTel. RPs 131, 132, 133 provide flexible and efficient call processing services because they can be controlled by a destination to provide real-time control over call routing. RP 133 could be controlled by destination 140. RP 133 could be located externally from destination 140, or it could be located on premise.

FIG. 2 illustrates the operation of communication system 100 in an embodiment of the invention. Caller 101 places a call including a country code and a called number to communication network 110. Communication network 110 sends signaling (including the country code and the called number) to call processing system 120. Call processing system 120 receives the signaling with the country code and the called number.

Call processing system 120 processes the signaling based upon the country code to select which RP to query of RPs 131, 132, 133. Call processing system 120 then sends an RP query to the selected RP, which in this example is RP 131. The RP query typically includes the called number. RP 131 receives the RP query and processes the called number to determine routing instructions for the call. RP 131 sends an RP response to call processing system 120 that includes the routing instructions for the call. Call processing system 120 receives the RP response and processes the RP response to transfer routing instructions for the call to communication network 110. Communication network 110 receives the routing instructions and responsively connects the call to destination 140.

FIG. 3 also illustrates the operation of communication system 100 in an embodiment of the invention. Communication network 110 receives call signaling for a call with a country code and called number. Communication network 110 sends signaling (including the country code and the called number) to call processing system 120. Call processing system 120 processes the signaling based upon the country code to select which RP to query of RPs 131, 132, 133. Call processing system 120 then sends an RP query to a first selected RP, RP 131. The RP query typically includes the called number. RP 131 receives the RP query and processes the called number to select a second RP, RP 133. RP 131 sends an RP response indicating RP 133 to call processing system 120.

In response, call processing system 120 sends a second RP query, including the called number, to RP 133. RP 133 receives the query and processes the called number to determine routing instructions for the call. RP 133 sends an RP response to call processing system 120 that could include the routing instructions for the call. Call processing system 120 receives the RP response and processes the RP response to transfer the routing instructions for the call to communication network 110. Communication network 110 receives the routing instructions and connects the call to destination 140.

Second Embodiment Configuration and Operation—FIGS. 4–7

Figure 4:
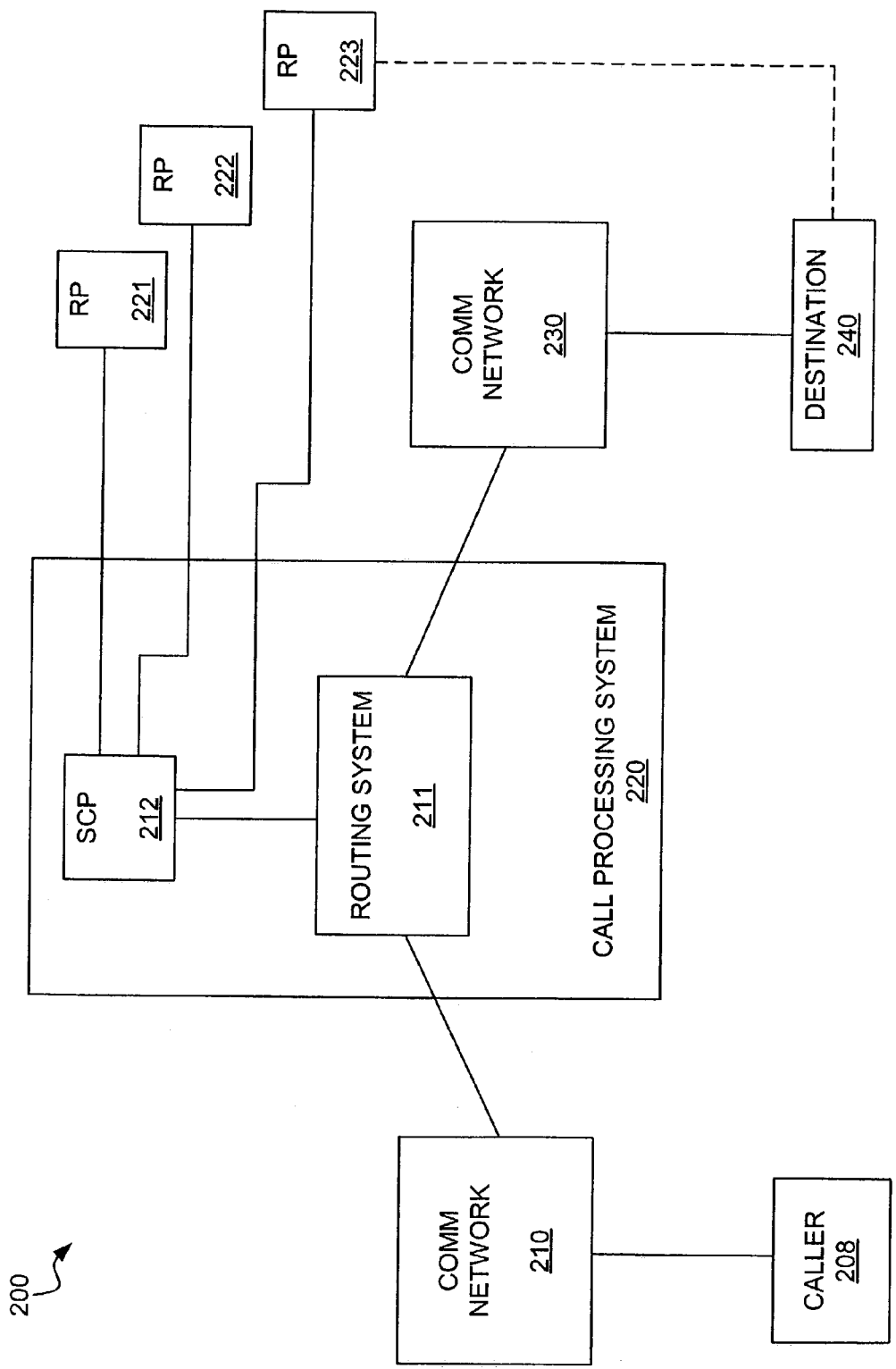
FIG. 4 illustrates a call processing system in an embodiment of the invention.

FIG. 4 illustrates communication system 200 in an embodiment of the invention. Communication system 200 comprises caller 208 connected to communication network 210. Communication network 210 is connected to routing system 211. Routing system 211 is connected to communication network 230. Communication network 230 is connected to destination 240. Call processing system 220 includes routing system 211 and SCP 212. SCP 212 is connected to routing system 211 and RPs 221, 222, and 223. RP 223 is controlled by destination 240.

Figure 5:
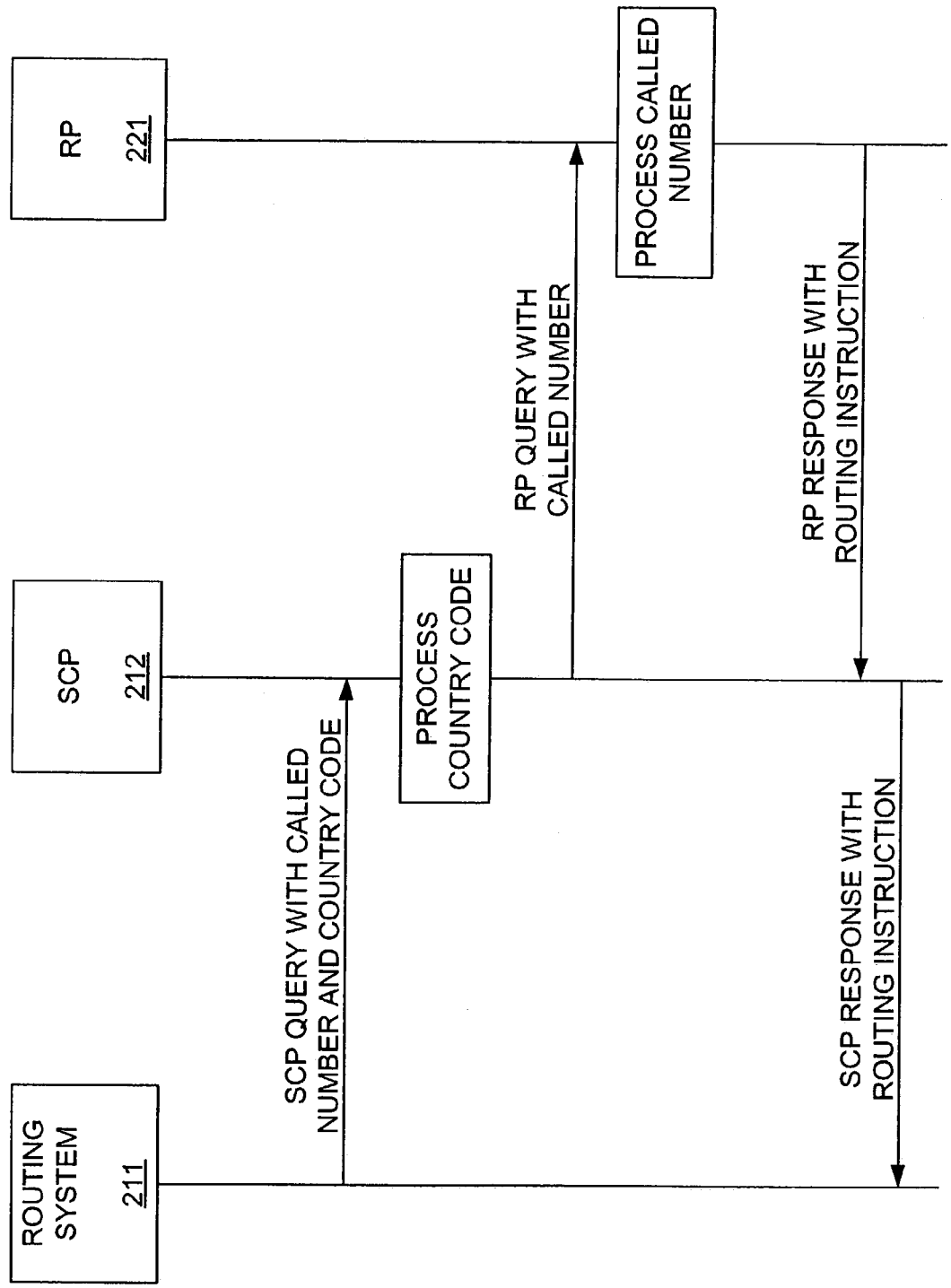
FIG. 5 illustrates the operation of a call processing system in an embodiment of the invention.

FIG. 5 illustrates the operation of a communication system 200 in an embodiment of the invention. Routing system 211 receives call signaling for a call, including a called number and a country code. In response to the country code, routing system 211 sends an SCP query to SCP 212. The SCP query includes the called number and the country code. SCP 212 receives the SCP query. SCP 212 processes the country code to select an RP from among a plurality of RPs. SCP 212 then sends an RP query, including the called number, to the selected RP 221. RP 221 receives the RP query and processes the called number to determine routing instructions for the call. RP 221 sends an RP response with the routing instructions for the call. SCP 212 receives the RP response. SCP 212 then sends an SCP response, including the routing instructions, to routing system 211.

Figure 6:
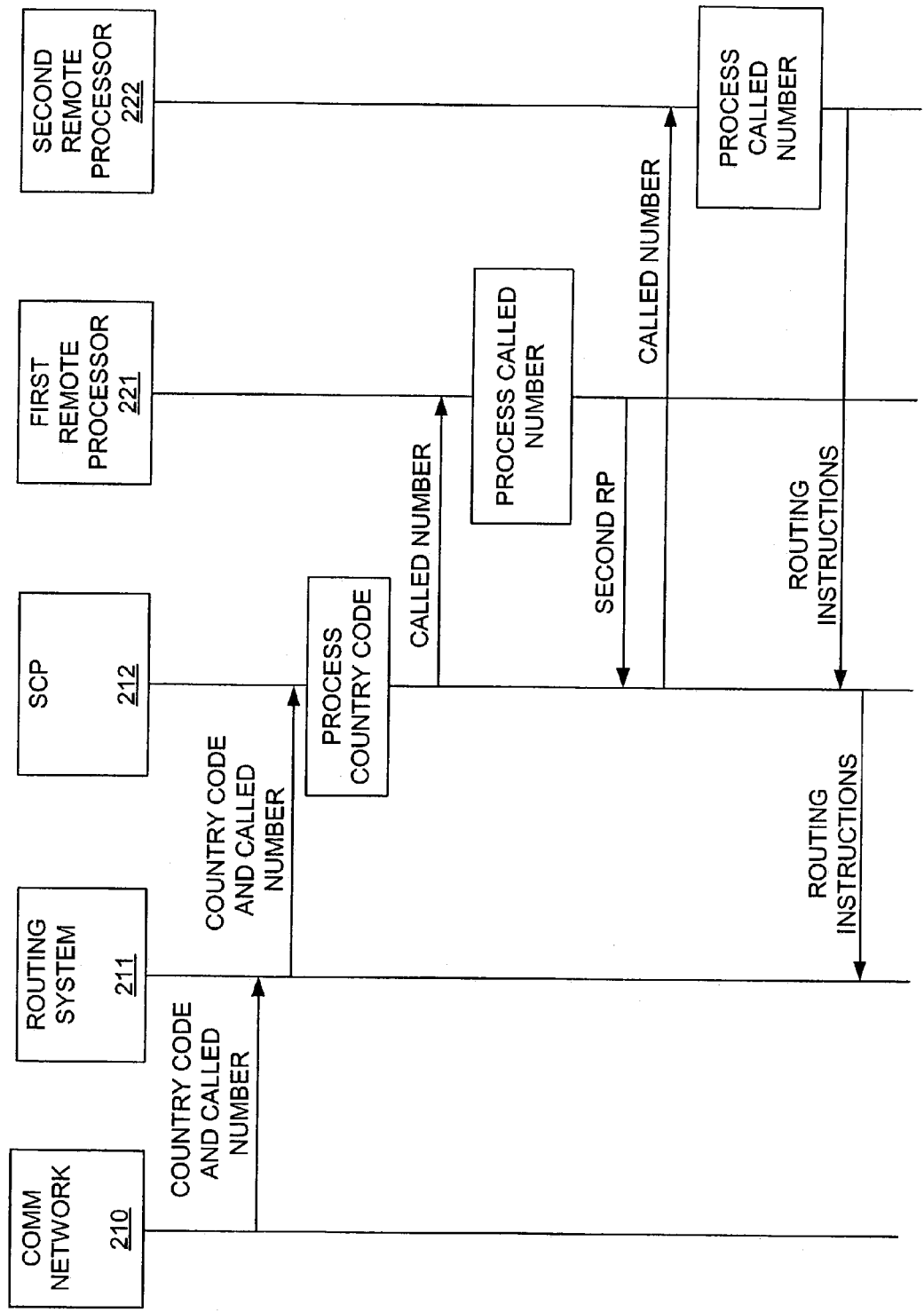
FIG. 6 illustrates the operation of a call processing system in an embodiment of the invention.

FIG. 6 also illustrates the operation of a communication system 200 in an embodiment of the invention. Communication network 210 receives a call including a country code and called number. Communication network 210 sends call signaling including the country code and called number to Routing system 211. Routing system 211 receives the call signaling. Routing system 211 sends an SCP query to SCP 212. The SCP query includes the called number and the country code. SCP 212 receives the SCP query. SCP 212 processes the country code to select a first RP from among a plurality of RPs. SCP 212 then sends an RP query, including the called number, to the first RP 221.

RP 221 receives the RP query and processes the called number to determine a second RP. RP 221 sends an RP response indicating the second RP 222. SCP 212 receives the RP response. SCP 212 then sends a second RP query including the called number to second RP 222. RP 222 receives the RP query and processes the called number to determine routing instructions for the call. RP 222 sends an RP response to SCP 212. SCP 212 receives the RP response, including the routing instructions, and sends an SCP response to routing system 211. Routing system 211 receives the SCP response, including the routing instructions, and forwards the routing instructions to communication network 210. Communication network 210 connects the call.

Figure 7:
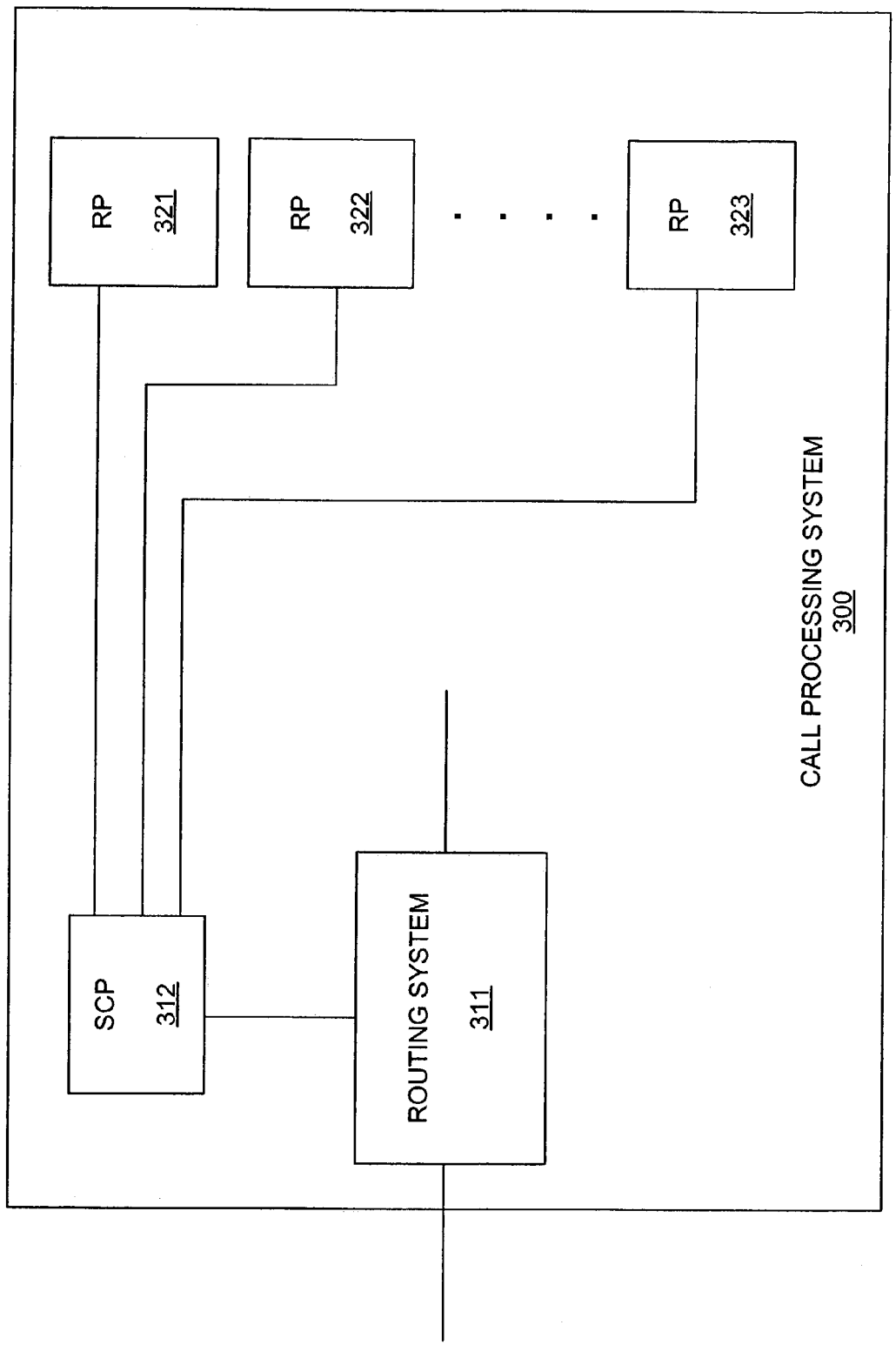
FIG. 7 illustrates a call processing system in an embodiment of the invention.

FIG. 7 illustrates call processing system 300 in an embodiment of the invention. Call processing system 300 includes routing system 311, SCP 312, and RPs 321, 322, and 323, although more RPs are possible. Routing system 311 is connected to SCP 312. SCP 312 is connected to RPs 321, 322, and 323. The elements of call processing system 300 can be connected to other communication systems, networks, or devices, including possibly callers and destinations as are well known in the art.

Figure 8:
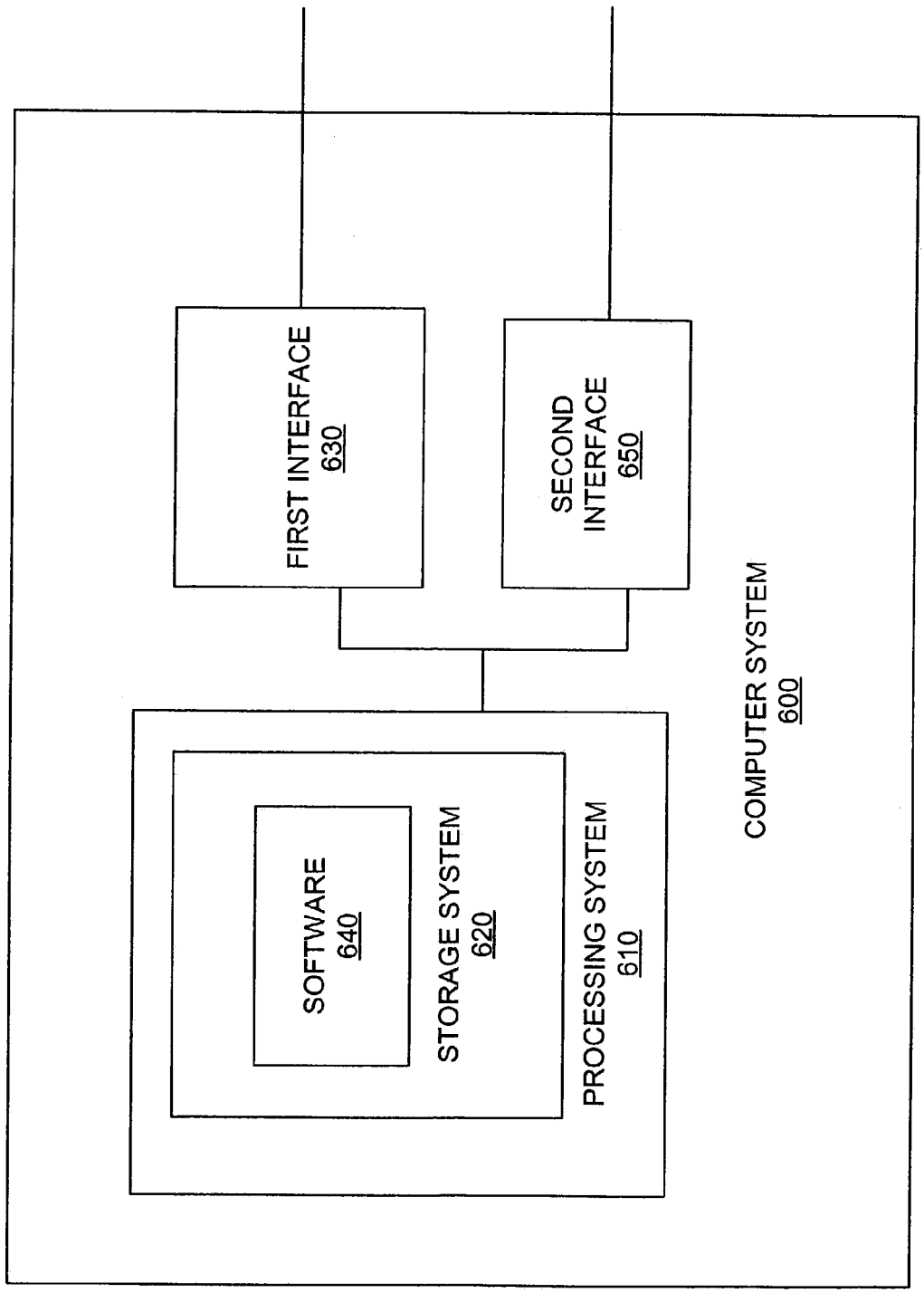
FIG. 8 illustrates a computer system in an embodiment of the invention.

Computer System Configuration—FIG. 8

FIG. 8 illustrates computer system 600 that could be used to implement aspects of the invention. In particular, computer system 600 could be used in call processing system 120, communication system 200, call processing system 300, SCP 212, SCP 312, or in another communication device. Computer system 600 includes processing system 610, storage system 620, software 640, first interface 630, and second interface 650. Storage system 620 stores software 640. Processing system 610 is linked to first interface 630 and second interface 650. Computer system 600 could be comprised of programmed general-purpose computers, although those skilled in the art will appreciate that programmable or special purpose circuitry and equipment may be used. Computer system 600 may use a client server architecture where operations are distributed among a server system and client devices that together comprise elements 610–650.

First interface 630 could comprise a network interface card, modem, port, or some other communication device. First interface 630 may be distributed among multiple communication devices. Processing system 610 could comprise a computer microprocessor, logic circuit, or some other processing device. Processing system 610 may be distributed among multiple processing devices. Second interface 650 could comprise a keyboard, mouse, voice recognition interface, microphone and speakers, graphical display, touch screen, or some other type of user device. Storage system 620 could comprise a disk, tape, integrated circuit, server, or some other memory device. Storage system 620 may be distributed among multiple memory devices.

Processing system 610 retrieves and executes software 640 from storage system 620. Software 640 may comprise an operating system, utilities, drivers, networking software, and other software typically loaded onto a general-purpose computer. Software 640 could also comprise an application program, firmware, or some other form of machine-readable processing instructions. When executed by the processing system 610, software 640 directs the processing system 610 to operate as described for communications system 100.

Call Center Example of the Invention

In an example of the invention, a caller places a call to a call center, such as a reservations center for an airline. The call includes a called number, such as a toll-free 800 number, and a country code. The call signaling for the call is received by a call processing system. The call processing system processes the country code to select an RP from a plurality of RPs. The call processing system sends an RP query to the RP to determine routing instructions for the call. The RP sends an RP response to the call processing system including the routing instructions. The call processing system connects the call according to the routing instructions.

In another example of the invention, a call processing system processes a country code to select a first RP from a plurality of RPs. The first RP could be an RP configured to determine which second RP of the pluarality of RPs should be queried to determine routing instructions for the call. The first RP indicates to the call processing system which second RP to query for routing instructions. The call processing system queries the second RP for routing instructions. The second RP responds to the call processing system with routing instructions for the call.

In another example of the invention, a call processing system could include a data table with country codes associated with RPs. The call processing system could process a country code to determine which RP to select to determine routing instructions for a call. In another example of the invention, the call processing system could process a country code to determine which RP of a plurality of RPs to select to determine a second RP to determine routing instructions for a call. The first and second RP could include a data table associating called numbers with the plurality of RPs. The first and second RP could also include a data table associating called numbers with routing instructions.

In another example of the invention, an RP could be controlled remotely by an element such as the airline reservation center in the above example. The airline reservation center could control how the RP processes a country code or a called number. The RP could also be controlled independently through a user interface. The RP could also be controlled by the call processing system. Selecting the RP based upon the country code allows for more efficient and economical international call services.

What is claimed is:

1. A method of operating a call processing system comprising a routing system and a Service Control Point (SCP) that is configured to communicate with more than one remote processors, the method comprising:
   in the routing system, receiving signaling for a call wherein the signaling indicates a called number including an international country code;
   processing the international country code to transfer an SCP query including the international country code from the routing system to the SCP;
   in the SCP, processing the international country code to select one of the remote processors from the more than one remote processors wherein the more than one remote processors are located at more than one call centers respectively;
   transferring a remote processor query to the one remote processor;
   receiving a remote processor response from the one remote processor; and
   processing the remote processor response to transfer a routing instruction for the call.

2. The method of claim 1 wherein transferring the remote processor query and receiving the remote processor response comprises transferring the remote processor query from the SCP and receiving the remote processor response in the SCP.

3. The method of claim 2 wherein processing the remote processor response to transfer the routing instruction comprises processing the remote processor response in the SCP to transfer an SCP response including the routing instruction, and further comprising:
   in the routing system, receiving the SCP response; and
   in the routing system, processing the routing instruction to route the call.

4. The method of claim 1 further comprising receiving the remote processor query in the one remote processor, processing the remote processor query in the one remote processor, and transferring the remote processor response from the one remote processor.

5. The call processing system of claim 1 wherein the SCP is further configured to transfer the remote processor query to the one remote processor, and process the remote processor response from the one remote processor to transfer the routing instruction for the call to the routing system.

6. The method of claim 1 wherein the one remote processor comprises a call manager.

7. A call processing system that is configured to communicate with more than one remote processors, the call processing system comprising:
   a routing system configured to receive signaling for a call wherein the signaling indicates a called number including an international country code, and process the international country code to transfer an SCP query including the international country code; and
   a Service Control Point (SCP) configured to receive the SCP query, process the international country code to select one of the remote processors from the more than one remote processors wherein the more than one remote processors are located at more than one call centers respectively, transfer a remote processor query to the one remote processor, and process a remote processor response from the one remote processor to transfer a routing instruction for the call to the routing system.

8. The call processing system of claim 7 further comprising the one remote processor configured to receive the remote processor query from the processing system, process the remote processor query, and transfer the remote processor response to the processing system.

9. The call processing system of claim 8 wherein the remote processor response includes the routing instruction for the call.

10. The call processing system of claim 7 wherein the one remote processor comprises a call manager.

11. A software product for a Service Control Point (SCP) wherein the SCP is configured to receive an SCP query indicating a called number including an international country code, transfer a remote processor query to one of more than one remote processors, receive a remote processor response from the one remote processor, and transfer a routing instruction, the software product comprising:
    software configured to process the international country code to select the one remote processor from the more than one remote processors wherein the more than one remote processors are located at more than one call centers respectively, and process the remote processor response to generate the routing instruction; and
    a storage system that stores the software.

12. The software product of claim 11 wherein the one remote processor comprises a call manager.

* * * * *